(12) United States Patent
Kong et al.

(10) Patent No.: US 6,556,014 B1
(45) Date of Patent: Apr. 29, 2003

(54) DEVICE AND METHOD FOR MEASUREMENT BY GUIDED WAVES ON A METAL STRING IN A WELL

(75) Inventors: Fan-Nian Kong, Oslo (NO); Harald Westerdahl, Dal (NO); Terje Eidesmo, Ranheim (NO); Svein Ellingsrud, Trondheim (NO)

(73) Assignees: Den Norske Stats Oljeselskap A.S., Stavanger (NO); Norges Goetekniske Institutt, Oslo (NO)

( * ) Notice: Subject to any disclaimer, the term of this patent is extended or adjusted under 35 U.S.C. 154(b) by 0 days.

(21) Appl. No.: 09/719,635

(22) PCT Filed: Jun. 17, 1999

(86) PCT No.: PCT/NO99/00200

§ 371 (c)(1),
(2), (4) Date: Mar. 6, 2001

(87) PCT Pub. No.: WO00/00849

PCT Pub. Date: Jan. 6, 2000

(30) Foreign Application Priority Data

Jun. 18, 1998 (NO) .......................... 19982825

(51) Int. Cl.[7] .............................. G01V 3/12; G01V 3/30; G01V 3/28
(52) U.S. Cl. .......................... 324/338; 324/339; 175/50
(58) Field of Search .............................. 324/338, 339, 324/340, 341, 342, 343, 332, 333, 334, 337; 175/40, 50; 166/250.01

(56) References Cited

U.S. PATENT DOCUMENTS

| 4,933,640 A | * | 6/1990 | Kuckes ........................ 324/339 |
| 5,233,304 A | | 8/1993 | Hubans ........................ 324/323 |
| 5,363,094 A | | 11/1994 | Staron et al. ............ 340/854.6 |
| 5,453,693 A | | 9/1995 | Sinclair et al. ............. 324/324 |
| 5,552,786 A | | 9/1996 | Xia et al. ...................... 342/22 |
| 5,860,483 A | | 1/1999 | Havig .......................... 175/40 |

FOREIGN PATENT DOCUMENTS

WO 98/12579 3/1998

\* cited by examiner

*Primary Examiner*—Walter E. Snow
(74) *Attorney, Agent, or Firm*—Foley & Lardner

(57) ABSTRACT

A device for detecting changes of resistivity or dielectrical properties due to changes of fluid composition in the near-well area about a well in a geological formation, comprising an electrically conductive tubing string, an electrical energy source, a signal generator, at least one transmitting antenna for emitting electromagnetic waves along the tubing string, one or more receiver antennas for receiving electromagnetic waves reflected along the tubing string, devices for receiving signals induced in the receiver antennas, signal processing means for processing the received signals, and communication devices for transmitting signals representing the electrical signals and for receiving control signals.

40 Claims, 2 Drawing Sheets

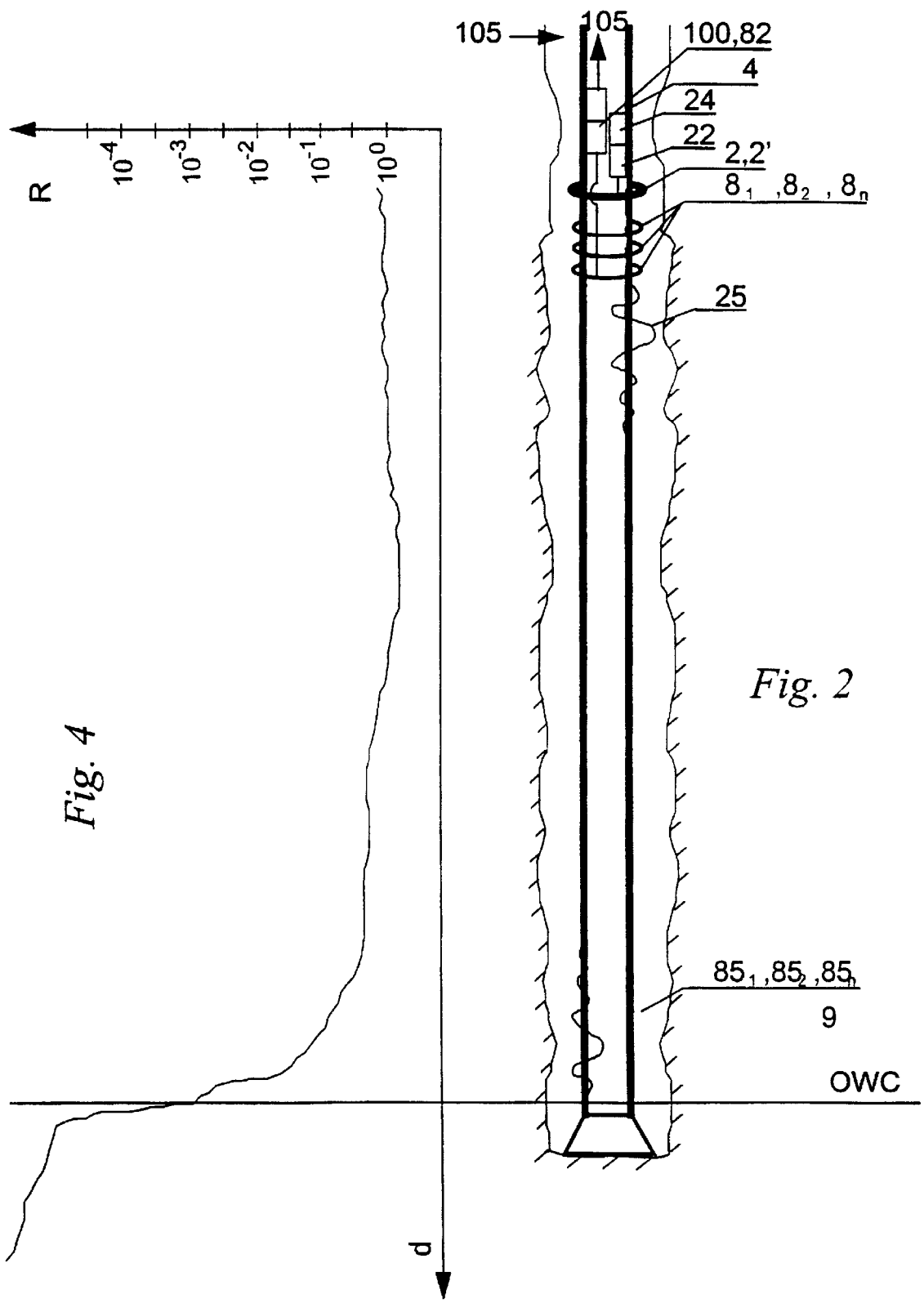

DEVICE AND METHOD FOR MEASUREMENT BY GUIDED WAVES ON A METAL STRING IN A WELL

FIELD OF INVENTION

This invention relates to the topic of geophysical logging, particularly logging of a petroleum well by means of guided electromagnetic waves. What is being logged is electrical properties and changes in these, preferably in rocks situated along a metallic string in a drilled well.

BACKGROUND OF THE INVENTION

The metallic string may be a drillstring or a production tubing. The electromagnetic parameter is the wave impedance between the electrically conductive string and the surroundings. The string's surroundings comprise a cylindrical cavity generally axially parallel with the string, and more or less porous and permeable geological (mainly sedimentary) layers of varying dielectrical permittivity combined with varying resistivity (conductivity). Due to their porosity the geological strata always contain more or less water. Sediments consisting of sandstones or carbonates have low electrical conductivity in their own, depending on the mineral composition, and schists have a somewhat higher electrical conductivity due to chemical composition and the ionic structure. Water is a polar liquid and may dissolve salts, e.g. NaCl, $CaCl_2$, NaFl which easily form ions $Na^+$, $Ca^{2+}$, $Cl^-$ etc. This water is electrically conductive with resistivity roughly around 0.01 $\Omega$m–1 $\Omega$m, depending on the amount of dissolved salt and the ionic valence. Oil and gas does not dissolve corresponding amounts of salt. Rocks containing oil or gas have much less electrical conductivity, thus larger resistivity, crudely estimated to be in the range of $10^1$ $\Omega$m–$10^3$ $\Omega$m.

Statement of Problem

By production from a well is meant to take out liquids and gases. During production of an oil-bearing well one normally does not want to produce water. Due to the liquid density one will, in a liquid trap, e.g. a synform or a fault, encounter gas, oil and water as counted from above in a petroleum-bearing zone in a well. The boundary surfaces in an undisturbed oil/gas/water zone are usually horizontal. The well may contain several petroleum-bearing zones. When taking out oil and gas the boundary surface between oil and water will rise. This boundary surface is called the oil/water contact, hereafter called the OWC: Oil/Water Contact. Due to the liquid not being entirely ideally fluid, but has a limited permeability in the porous rock, the OWC will not be horizontal, but more or less shaped as a curved surface. The shape of the liquid surfaces is determined by the relative viscosities for gas, oil and water and the local permeabilities in the rocks. It is desirable to monitor such liquid surfaces during production of oil or injection of water, natural gas, $CO_2$ or other fluids in the reservoir.

Radar-similar detection in boreholes is known, both by means of pulsed electromagnetic waves and continuous coherent electromagnetic waves. The electromagnetic waves are generated by a signal generator and emitted by means of a rod-shaped or ring-shaped dipole antenna, e.g. fixed to a logging sonde lowered in the borehole. Such borehole radars are described in U.S. Pat. No. 5,530,359: "Borehole logging tools and methods using reflected electromagnetic signals", describing a directionally sensitive logging sonde having a transmitter antenna and several rod antennas arranged azimuthally about the sonde's vertical axis.

U.S. Pat. No. 4,504,833: "Synthetic pulse radar system and method" describes a "georadar" emitting pulsed signals consisting of a series of selected frequencies emitted simultaneously. The system is arranged for a mobile platform and is arranged for sending electromagnetic waves down into geological formations and for detecting electromagnetic waves being reflected from impedance contrasts inside the geological formations.

The patent publication expected to be closest to this invention is U.S. Pat. No. 5,552,786: "Method and apparatus for logging underground formations using radar" concerning a method to determine wave velocities for the radar waves propagating from the transmitter antenna to the receiver antenna "directly" via the rocks being closest to the borehole. The wave velocities derived from the measurements between transmitter and receiver antenna (a few feet) is used for the geophysical interpretation of the geological structures around the borehole.

SUMMARY OF THE INVENTION

The above mentioned problems are solved by means of a device and a method according to this invention which in a preferred embodiment is a device for detection of changes in resistivity or dielectrical properties due to changes of fluid composition in the near-well area 0–500 m about a well 1 in a geological formation 9, comprising an electrically conductive tubing string 4, e.g. a liner pipe or other fixedly mounted tube or openhole completion in the well 1.

A preferred embodiment of the present invention comprises a device for detecting changes in resistivity or dielectrical properties in the near-well area around a well in a geological formation, comprising an electrically conductive tubing string having a linear dimension, an electrical energy source, a signal generator electrically coupled to the electrical energy source, the signal generator being capable of generating electrical signals, a transmitter antenna coupled to the tubing string in a fixed first position and electronically coupled to the signal generator, the transmitter antenna configured to emit electromagnetic waves guided along the tubing string, a receiver antenna for receiving electromagnetic waves along the tubing string coupled to the tubing string in a fixed second position a distance along the linear dimension apart from the fixed first position of the transmitter antenna, a device for receiving signals induced in the receiver antenna by received electromagnetic waves, a signal processing device capable of processing the received signal and providing a processed signal output, and a communication device electronically coupled to the signal processing device, the communication device being capable of transmitting signals representing the processed signal output and receiving a control signal.

Another preferred embodiment of the present invention comprises:

a) an electrical energy source 24, b) a signal generator 22 for generation of electromagnetic signals 25 to c) at least one transmitter antenna 2 for electromagnetic waves 26, arranged preferably above an oil/water contact, in a fixed first position on the tubing string 4, and arranged so as to guide the electrical waves along the tubing string 4, d) one or more receiver antennas ($8_1, 8_2, \ldots, 8_n$) for guided electromagnetic waves along the tubing string 4, arranged in other fixed positions along the tubing string 4, e) devices 80 for receiving signals ($85_1, 85_2, \ldots, 85_n$) induced in the receiver antennas ($8_1, 8_2, \ldots, 8_n$) due to wave impedance gradients along the tubing string 4 in rocks or fluids in the geological formation 9 and in the electrically conductive tubing string 4, f) signal processing devices 82 for processing of the received signals ($85_1, 85_2, \ldots, 85_n$), g) communication devices 100, 200 for transmission of signals 105 representing the electrical signals ($85_1, 85_2, \ldots, 85_n$), and for receiving control signals 205.

Additional features by the invention are defined in the enclosed patent claims and described in the detailed description below.

BRIEF DESCRIPTION OF THE DRAWINGS

FIG. 2 shows the same as FIG. 1, but here the metallic tubing string is replaced by a drillstring.

FIGS. 3 and 4 display illustrations of resistivity logs which may be achieved by means of a device and a method according to the invention. Two graphs named "before" and "after" are shown in FIG. 3, with resistivity change arising due to displacement of the oil/water contact (OWC).

DETAILED DESCRIPTION OF THE INVENTION

Figure 3:
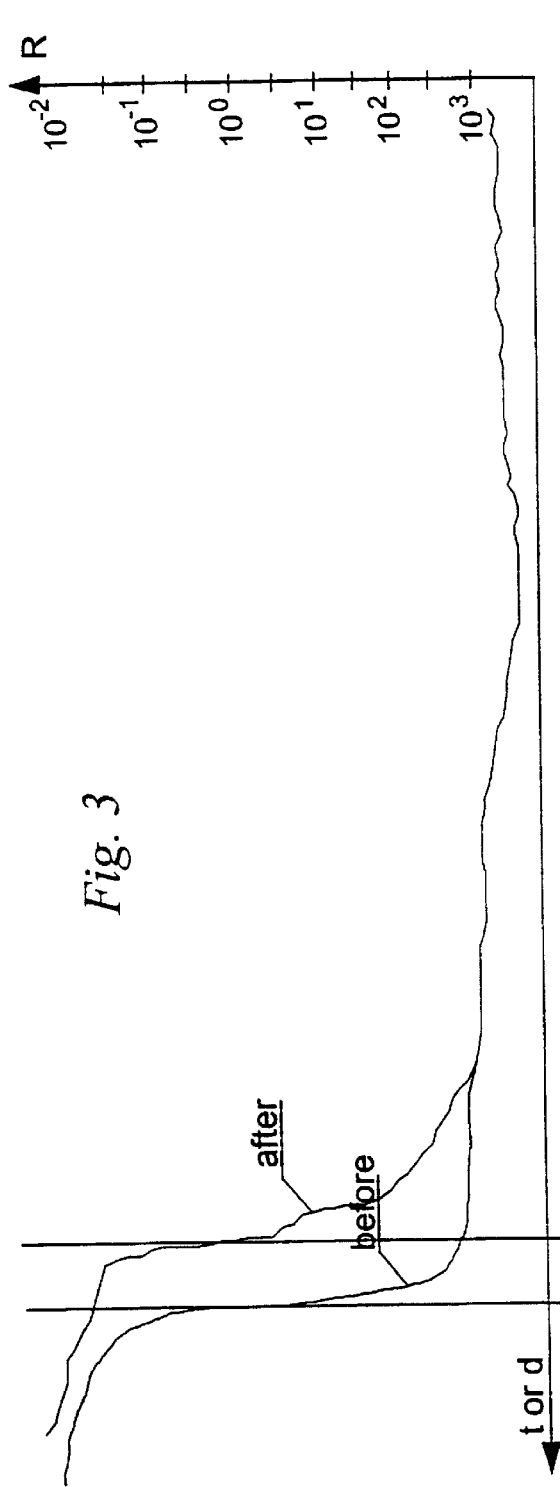
Figure 1:
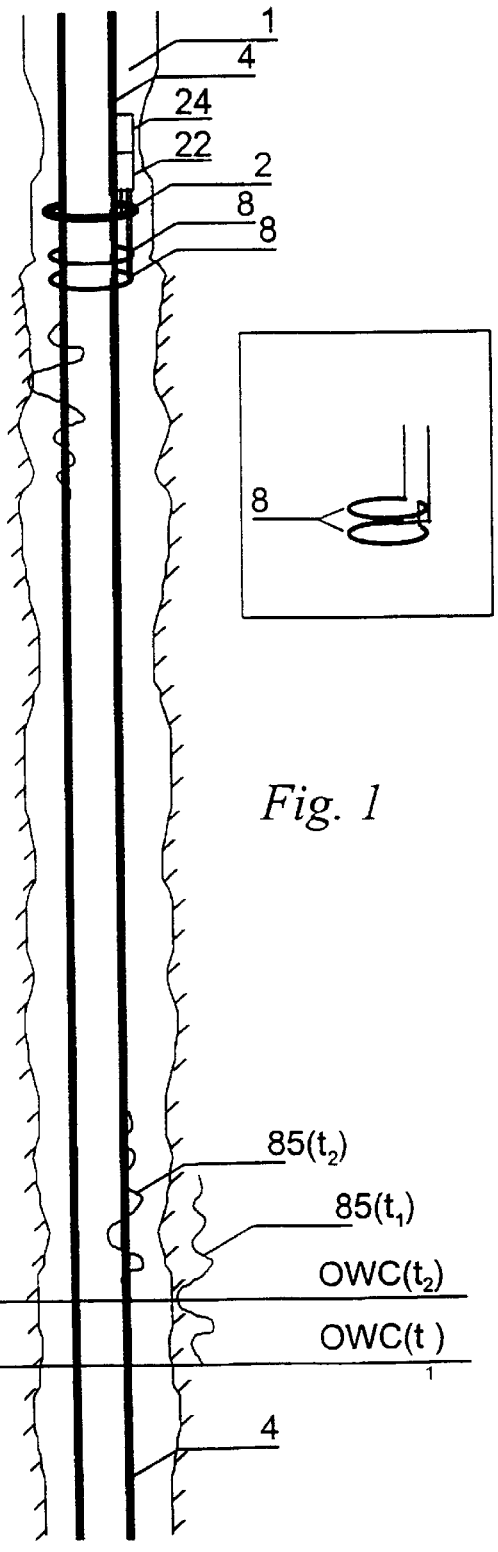
FIG. 1 shows a view and partial section of a principle embodiment of the invention comprising a metallic tubing string with a transmitter antenna and two receiver antennas for guided electromagnetic waves.

A general embodiment of the invention is a device for detecting changes of resistivity or dielectrical properties due to changes of fluid compositions in the near-well area 0–500 m about a well 1 in a geological formation 9. In the well 1 an electrically conductive tubing string 4 is arranged, e.g. a liner pipe or another fixedly arranged tube or an openhole completion. In FIG. 1 is illustrated a principle embodiment of the invention, comprising the following features:

a) An electrical energy source 24, for supplying energy to a signal generator 22 and possibly an amplifier and to a transmitter antenna 2 and to other electrical equipment in the well being described below.

b) A signal generator 22 for generation of electrical signals 25 to the transmitter antenna 2.

c) At least one transmitter antenna 2 for electromagnetic waves 26, with the transmitter antenna 2 being arranged preferably above an oil/water contact, on a fixed first position on the tubing string 4, and arranged for mainly to guide the electromagnetic waves along the tubing string 4. In a preferred embodiment of the invention the transmitter antenna 2 or a prefabricated tubing string module (not shown) comprising the transmitter antenna 2 may be fixedly cemented to the borehole wall in the well 1.

d) One or more receiver antennas ($8_1, 8_2, \ldots, 8_n$) for guided electromagnetic waves along the tubing string 4, are arranged in other fixed positions along the tubing string 4. These receiver antennas may also, in a preferred embodiment, be present as preassembled modules before they are lead down in the well and fixedly cemented to the geological formation 9.

e) Devices 80 for receiving signals ($85_1, 85_2, \ldots, 85_n$) induced in the receiver antennas ($8_1, 8_2, \ldots, 8_n$) due to wave impedance gradients along the tubing string 4 in rocks or fluids in the geological formation 9 and in the electrically conductive tubing string 4. These wave impedance gradients along the tubing string 4 may be caused by the spatial variation of resistivity as an intrinsic property of the geological strata and in pore fluids in the rocks, e.g. water containing larger or smaller quantities of salt, and oil. Due to the fact that the electromagnetic waves are guided along the tubing string 4 one may compare this with the metal core of a coaxial cable, and the geological formation around the tubing string 4 may be compared to the dielectricum surrounding such a metal core in the coaxial cable.

f) Signal processing devices 82 for processing the received signals ($85_1, 85_2, \ldots, 85_n$) may in an embodiment be arranged in the immediate vicinity of the receiver antennas ($8_1, 8_2, \ldots, 8_n$). However the signal processing devices 82 may be arranged in a combined unit downhole in the well 1, or at the surface.

g) communication devices 100, 200 for transmission of signals 105 representing the electrical signals ($85_1, 85_2, \ldots, 85_n$), and for receiving control signals 205. These communication devices 100, 200 may transfer information about measurement signals from a petroleum reservoir in the geological formation 9 to the surface for interpretation of e.g. the oil/water contact and its movement. In alternative embodiments of the invention the signals 105 may be conducted to other downhole devices for controlling the production flow.

In a preferred embodiment, the receiver antennas ($8_1, 8_2, \ldots, 8_n$) are arranged with preferably even internal separation in a zone covering at least a part above the oil/water contact (OWC) and preferably down to the oil/water contact. In a preferred embodiment there is arranged a pair of receiver antennas ($8_1, 8_2$) by the top of the reservoir. Electromagnetic waves being emitted from the transmitter antenna 2 are guided along the tubing string 4 downward to the oil water contact. By the oil/water contact a reflection will be formed, which returns an electromagnetic wave 85. This wave 85 will be picked up by the receiver antennas ($8_1, 8_2$). The distance to the oil/water contact may be determined from a two-way travel time to the reflecting surface by determining a propagation velocity from resistivity logs and frequency. Canceling devices 8' may be positioned by the receiver antennas ($8_1, 8_2, \ldots, 8_n$) and arranged so as to cancel the receiver antennas of the direct emitted signal from the transmitter antenna 2. The receiver antennas ($8_1, 8_2$) may be oppositely coupled and arranged to cancel the direct emitted electromagnetic wave 26. If the receiver antennas are coupled to cancel the direct wave the receiver antennas ($8_1, 8_2$) may be arranged to preferably receive reflected guided waves (85) travelling up the tubing string. The cancelling may be performed physically or take place as a subtraction in a data processor.

In an alternative embodiment, e.g. with an existing production well available, one may arrange the transmitter antenna 2 and the receiver antennas ($8_1, 8_2$) by the top of the production string. In this way one may apply a device according to the invention for surveillance of existing completed wells.

In a preferred embodiment the signal generator 22 is arranged to generate electrical signals 25 for emission of coherent continuous electromagnetic signals 26 from the transmitter antenna 2. In an additionally preferred embodiment the signal generator 22 is arranged for generation of electromagnetic signals to the transmitter antenna 2 for emission of coherent continuous electromagnetic waves 26 by a number of i different frequencies ($f_1, f_2, \ldots, f_i$) from the transmitter antenna 2. Emission of coherent continuous electromagnetic signals implies that one avoids dispersion of the propagating electromagnetic signal due to phase spreading of the propagation velocities of the electromagnetic waves as function of the frequencies.

In alternative embodiments the signal generator 22 may be arranged to generate electrical signals to the transmitter antenna 2 for emission of frequency sweep electromagnetic signals 26.

In additionally alternative embodiments of the invention the signal generator 22 may be arranged for generating pulsed electrical signals 26, or other forms of modulation of electromagnetic signals, in the transmitter antenna 2. One must however bear in mind the limitations in the application of pulsed electromagnetic signals in a strongly dispersive medium with respect to frequency and phase velocity.

The signal processing devices 82 for processing of the received signals ($85_1, 85_2, \ldots, 85_n$) are arranged for detecting gradients of the electromagnetic impedance in the geological formation 9. However a manual geophysical interpretation may be done, based on the received signals ($85_1, 85_2, \ldots, 85_n$). The signal processing devices 82, used for processing the received signals $85_1, 85_2, \ldots, 85_n$), may be used to perform surveillance of a petroleum reservoir by arranging the signal processing devices to detect changes in the gradients of the electromagnetic impedance about the tubing string 4 in the geological formation 9 between two points of time $t_1$ and $t_2$. Naturally this may also take place by observation of logs describing the resistivity development between the two points of time $t_1$ and $t_2$.

In a preferred embodiment, the transmitter antenna 2 further comprises an impedance adjustment device 2' which is arranged to adjust the impedance of the transmitter antenna 2 for each of the emitted discrete frequencies ($f_1$, $f_2, \ldots, f_i$) to maximize energy emission in the form of guided electromagnetic waves along the electrically conductive tubing string 4. If the transmitter antenna in an alternative embodiment comprises a pulse transmitter, with the emitted electromagnetic pulse implying a broad frequency spectrum, the antenna must be designed so as to emit the essential part of the energy out along the tubing string 4. As mentioned above, the pulse technique incurs phase dispersion of the propagation velocities in the medium.

In a preferred embodiment the antennas 2, 8 are arranged on or by the tubing string 4 inside the geological formation 9. As mentioned above there may, in a preferred embodiment, be such that at least one of the antennas 2, 8 be arranged by the earth's surface, preferably near the upper end of the tubing string 4, or far down on the tubing string 4.

In a preferred embodiment for emitted frequencies below about 10 MHz, electrical coils will be used as receiver antennas ($8_1, 8_2, \ldots, 8_n$) arranged around the tubing string 4. For higher frequencies above 10 MHz, it is proposed to apply dipole antennas as receiver antennas ($8_1, 8_2, \ldots, 8_n$) arranged outside of the outer metallic surface of the tubing string 4. By 10 MHZ the wavelength in the rocks is between 2 and 4 meters, depending on the resistivity, thus a quarter-wave antenna becomes about 0.5 to 1 meter of length.

Clearly the invention may work with only one receiver antenna instead of 2 or n receiver antennas ($8_1, 8_2, \ldots, 8_n$).

In an alternative embodiment the transmitter 2 and the receiver antennas ($8_1, 8_2, \ldots, 8_n$) may be arranged on a module of a drillstring. Thus the invention may be applied for measurement while drilling, so-called MWD. Then the reflected waves 85 will change while the drillstring works downward through strata of varying resistivity and dielectrical properties.

Further embodiments of the present invention include two methods, one method with the antennas is arranged on a fixed, i.e. under normal conditions a fixed production tubing, and another method with the antennas arranged on a drill-string. In the first method one will be able to search for the oil/water contact and its movements. In the second method one may as mentioned above be able to investigate the electrical properties in the rocks being penetrated by the drillbit.

In a preferred embodiment the invention is a method for detecting changes in resistivity or dielectrical properties due to changes in fluid compositions in the near-well area 0–500 m around an electrically conductive tubing string 4 in a well 1 in a geological formation 9.

The method comprises the following steps:

i) Emission of a first series of electromagnetic waves $26_1$ along the tubing string 4 from a transmitter antenna 2 at a first fixed position in the well 1, at a first point of time $t_1$.

ii) Reception of a first series of guided electromagnetic waves ($85_1, 85_2, \ldots, 85_n$) at receiver antennas ($8_1, 8_2, \ldots, 8_n$) at second fixed positions in the well 1 by the tubing string 4, and transformation of the first series of reflected electromagnetic waves ($85_1, 85_2, \ldots, 85_n$) to first registrations $S_1$.

iii) Emission of a second series of electromagnetic waves $26_2$ along the tubing string 4 from the transmitter antenna 2 at the first fixed position at a later second point of time $t_2$, with the time difference $t_2-t_1$ typically being several hours, days or longer time. The purpose of this second emission is to monitor displacements and changes of electrical properties in the well and the geological formations 9 as mentioned above.

iv) Reception of a second series of guided electromagnetic waves ($85_1, 85_2, \ldots, 85_n$) at the receiver antennas ($8_1, 8_2, \ldots, 8_n$) at the second fixed positions by the tubing string 4 at the later second point of time $t_2$, and transformation of the second series of reflected electromagnetic waves ($85_1, 85_2, \ldots, 85_n$) to second registrations $S_2$.

v) Forming of a difference $D_{t2-t1}$ by subtraction of the first registrations $S_1$ from the second registrations $S_2$, and interpretation of the difference $D_{t2-t1}$ as a distance to a change of electromagnetic impedance caused by a displacement of a liquid horizon or liquid front, e.g. an oil/water contact OWC.

The steps (iii) to (iv) and (v) may be repeated as many times as desirable. The method may be performed by an operator or by an algorithm which may be situated in downhole processing equipment.

In a preferred embodiment, method steps (i) and (iii) further comprise the generation of coherent continuous electromagnetic signals $26_1$ and $26_2$ from the transmitter antenna 2. In an additionally preferred embodiment according to the invention incorporates generation of electromagnetic waves $26_1$ and $26_2$ at a number of i different frequencies $f_1, f_2, \ldots, f_i$ from the transmitter antenna 2.

Cancelling in the receiver antennas ($8_1, 8_2, \ldots, 8_n$) of the emitted direct signal 25 from the transmitter antenna 2 is performed by cancelling devices 8' as mentioned above during the description of the device according to the preferred embodiment.

Impedance adjustment of the transmitter antenna 2 is performed to adapt the transmitter antenna to each of the particular discrete frequencies $f_1, f_2, \ldots, f_i$ being emitted, for maximal energy propagation with the electrically conductive tubing string 4. Corresponding tuning or impedance adjustment of the receiver antennas ($8_1, 8_2, \ldots, 8_n$) is performed for each of the particular discrete frequencies ($f_1, f_2, \ldots, f_i$) being emitted, for maximum energy reception of the reflected electromagnetic waves along the electrically conductive tubing string 4.

Of the received signals ($85_1, 85_2, \ldots, 85_n$) there is formed at least one discrete (Fourier-) frequency spectrum of at least two of the parameters amplitude $A(\omega)$, phase $\Phi(\omega)$, amplitude of the real part $Re(\omega)$, amplitude of the imaginary part $Im(\omega)$, with $\omega$ corresponding essentially to those frequencies ($f_1, f_2, \ldots, f_i$) which were emitted from the transmitter antenna 2. This frequency spectrum may be formed by means of sampling of the received signal series $85_1(t)$, $85_2(t), \ldots, 85_i(t)$ and following transformation to the frequency domain. An alternative is to measure received amplitude $A(\omega)$ and phase $\Phi(\omega)$ for each received signal series $85_1(t), 85_2(t), \ldots, 85_i(t)$ directly, and thus build up a frequency spectrum directly on the frequencies ($f_1, f_2, \ldots, f_i$).

On use of discrete continuous waves, an inverse Fourier transform $F(\omega) \rightarrow f(t)$ may be performed on at least two of the parameters amplitude $A(\omega)$, phase $\Phi(\omega)$, amplitude of the real part $Re(\omega)$, amplitude of the imaginary part $Im(\omega)$, with $\omega$ corresponding essentially to those frequencies ($f_1, f_2, \ldots, f_i$), which were emitted from the transmitter antenna 2, in order to form a time series $f(t)$ representing pseudo-reflexes formed by electromagnetic impedance gradients in the geological formation (9). Other analysis methods may also be applied for analysing the measurements $85_1(t)$, $85_2(t), \ldots, 85_i(t)$. The information on OWC-displacement may be applied in "smart" wells for controlling the production process or entered as parameters into a reservoir model which in turn is applied for controlling the production from an entire reservoir with many wells.

An alternative method is according to the invention applied during logging of electrical properties in a geological formation 9 during drilling of a well 1. The method comprises a repeated series of the following steps:

i) Emission of a first series of guided electromagnetic waves $25_1$ along the tubing string 4 from a transmitter antenna 2 arranged outside the drilling string's 4 metallic surface, at a first point of time $t_1$;

ii) Reception of a first series of reflected electromagnetic waves ($85_1, 85_2, \ldots, 85_n$) by at least one, preferably more receiver antennas ($8_1, 8_2, \ldots, 8_n$) arranged outside the drillstring's 4 metallic surface, and transformation of the first series of reflected electromagnetic waves ($85_1, 85_2, \ldots, 85_n$) to registrations $S_1$;

iii) Drawing up the registrations $S_1$ as a log of change of electromagnetic impedance caused by resistivity and permittivity in the strata of the geological formation 9 being penetrated as the drilling of the well 1 takes place.

A preferred method according to the invention comprises continuous surveillance of the registrations $S_1$ during drilling in order to detect that the drillstring's 4 lower end is approaching an electrically conductive horizon, e.g. an oil/water contact (OWC).

The same techniques for application of continuous coherent waves 26 may be applied as mentioned above. In the same way the antennas may be tuned and there may be performed a cancelling of the direct wave in order to better detect reflected guided waves from the end of the drillstring, and to have a better utilization of the dynamic range in the signal processing.

What is claimed is:

1. A device for detecting changes in resistivity or dielectrical properties in the near-well area around a well in a geological formation, comprising:

a tubing string, the tubing string being electrically conductive and having a linear dimension with a first end and a second end;

an electrical energy source;

a signal generator electrically coupled to the electrical energy source, the signal generator being capable of generating electrical signals;

a transmitter antenna coupled to the tubing string in a fixed first position and electronically coupled to the signal generator, the transmitter antenna configured to emit electromagnetic waves guided along the tubing string, and having an impedance;

a receiver antenna coupled to the tubing string in a fixed second position a distance along the linear dimension apart from the fixed first position of the transmitter antenna, the receiver antenna being capable of receiving electromagnetic waves along the tubing string;

a canceling device coupled to the tubing string and positioned near the receiving antenna, the canceling device being capable of canceling in the receiving antenna the electromagnetic waves emitted by the transmitter antenna;

a device for receiving signals induced in the receiver antenna by received electromagnetic waves, the device for receiving signals being electronically coupled to the receiver antenna;

a signal processing device electronically coupled to the device for receiving signals, the signal processing device being capable of providing a processed signal output; and a communication device electronically coupled to the signal processing device, the communication device being capable of transmitting signals representing the processed signal output and receiving a control signal.

2. A device according to claim 1, wherein the receiver antenna further comprises a plurality of receiver antennas coupled to the tubing string in fixed positions separated one from another along the linear dimension of the tubing string.

3. A device according to claim 2, wherein the plurality of receiver antennas are positioned in a zone along the linear dimension of the tubing string such that when the tubing string is positioned in a well containing an oil/water contact, the zone covers at least part of the tubing string above the oil/water contact.

4. A device according to claim 1, wherein the transmitter antenna comprises a plurality of transmitter antennas.

5. A device according to claim 2, wherein:

the device for receiving signals induced in the receiver antenna comprises a plurality of devices for receiving signals from the plurality of receiver antennas; and the signal processing device comprises a plurality of signal processing devices electronically coupled to the plurality of devices for receiving signals from the plurality of receiver antennas, the signal processing devices being capable of providing processed signal outputs.

6. A device according to claim 5, wherein the communication device comprises a plurality of communication devices electronically coupled to the plurality of signal processing devices, the communication devices being capable of transmitting signals representing the processed signal outputs and receiving control signals.

7. A device according to claim 1, wherein the signal generator is configured to cause the transmission antenna to emit coherent continuous electromagnetic waves.

8. A device according to claim 7, wherein the signal generator is configured to cause the transmission antenna to emit coherent continuous electromagnetic waves at a plurality of discrete frequencies.

9. A device according to claim 1, wherein the signal generator is configured to cause the transmission antenna to emit frequency sweep electromagnetic signals.

10. A device according to claim 1, wherein the signal generator is configured to cause the transmission antenna to emit pulsed electromagnetic signals.

11. A device according to claim 1, wherein the signal generator is configured to cause the transmission antenna to emit modulated electromagnetic signals.

12. A device according to claim 1, wherein the signal processing device is capable of detecting gradients in the electromagnetic impedance in a geological formation when the tube string is placed in a well.

13. A device according to claim 1, wherein the signal processing device is capable of detecting changes in gradients of electromagnetic impedance in the geological formation around the tubing string between a first time and a second time when the tube string is placed in a well.

14. A device according to claim 5, wherein the plurality of signal processing devices are capable of detecting changes in gradients of electromagnetic impedance in the geological formation around the tubing string between a first time and a second time when the tube string is placed in a well.

15. A device according to claim 8, wherein the transmitter antenna has an impedance and further comprises an impedance adjustment device electronically coupled to the transmitter antenna, the impedance adjustment device being capable of adjusting the impedance of the transmitter antenna for each of the discrete frequencies to maximize energy propagation of the emitted electromagnetic waves guided along the tubing string.

16. A device according to claim 1, wherein the transmitter antenna and the receiver antenna are coupled to the tubing string in positions that will be inside a geological formation when the tube string is placed in a well.

17. The device according to claim 1, wherein the transmitter antenna is coupled to the tubing string in a position near the end of the tube string that is up when the tube string is placed in a well.

18. A method for detecting changes of resistivity or dielectric properties due to changes of fluid compositions in the near-well area around a well in a geological formation, comprising the steps:
placing a tube string in the well;
emitting from a transmitter antenna a first series of electromagnetic waves guided along the tubing string at a first time;
receiving a first series of reflected electromagnetic waves in receiver antennas positioned near the tubing string;
transforming the received first series of reflected electromagnetic waves into first registrations;
emitting from the transmitter antenna a second series of electromagnetic waves along the tubing string at a second time;
receiving the second series of reflected electromagnetic waves in the receiver antennas;
transforming the received second series of reflected electromagnetic waves into second registrations;
forming a difference by subtracting the first registrations from the second registrations; and
interpreting the difference as a distance to a change of electromagnetic impedance caused by a liquid front.

19. The method according to claim 18, wherein the emitted first series of electromagnetic waves and the emitted second series of electromagnetic waves are coherent continuous electromagnetic signals.

20. The method according to claim 19, wherein the emitted first series of electromagnetic waves and the emitted second series of electromagnetic waves comprise a plurality of discrete frequencies.

21. The method according to claim 18, wherein the emitted first and second series of electromagnetic waves are canceled in the receiver antennas by canceling devices.

22. The method according to claim 20, wherein the transmitter antenna has an impedance and the transmitter antenna impedance is adjusted for each of the plurality of discrete frequencies of the emitted first and second series of electromagnetic waves to maximize energy propagation along the tubing string.

23. The method according to claim 20, wherein the receiver antennas each have an impedance and each receiver antenna impedance is adjusted to maximize energy reception of reflected electromagnetic waves for the plurality of discrete frequencies of the emitted first and second series of electromagnetic waves.

24. The method according to claim 20, further comprising the step of forming a discrete Fourier frequency spectrum of at least two of the parameters amplitude $A(\omega)$, phase $\Phi(\omega)$, amplitude of the real part $Re(\omega)$, and amplitude of the imaginary part $Im(\omega)$ of the received electromagnetic waves, with $\omega$ corresponding essentially to each of the discrete frequencies of electromagnetic waves emitted by the transmitter antenna.

25. The method according to claim 20, further comprising the step of performing an inverse Fourier transform of at least two of the parameters amplitude $A(\omega)$, phase $\Phi(\omega)$, amplitude of the real part $Re(\omega)$, and amplitude of the imaginary part $Im(\omega)$ of the received electromagnetic waves, with $\omega$ corresponding essentially to each of the discrete frequencies of electromagnetic waves emitted by the transmitter antenna.

26. A method for logging electrical properties in a geological formation during drilling of a well by a drillstring with an outer metallic surface, comprising the steps of:
emitting from a transmitter antenna positioned outside the drillstring's outer metallic surface a first series of electromagnetic waves guided along the drillstring at a first time and a second series of electromagnetic waves guided along the drillstring at a second time;
receiving a series of reflected electromagnetic waves in a receiver antenna positioned outside the drillstring's outer metallic surface, wherein the emitted first and second series of electromagnetic waves are canceled in the receiver antenna by a canceling device;
transforming the received series of reflected electromagnetic waves into a registration;
repeating the steps of emitting electromagnetic waves, receiving reflected electromagnetic waves and transforming received reflected electromagnetic waves into a registration multiple times as the drilling of the well progresses to form a log of registrations.

27. The method according to claim 26, wherein:
the step of receiving a series of reflected electromagnetic waves is accomplished with a plurality of receiver antennas positioned outside the drillstring's outer metallic surface; and
the step of transforming the received series of reflected electromagnetic waves into a registration further comprises transforming the received series of reflected electromagnetic waves into a plurality of registrations.

28. The method according to claim 26, further comprising the step of continuous surveillance of the registration during drilling of the well to detect when the drillstring's lower end approaches an electrically conductive horizon.

29. The method according to claim 26, wherein the emitted series of electromagnetic waves comprise coherent continuous electromagnetic signals.

30. The method according to claim 29, wherein the coherent continuous electromagnetic signals comprise a plurality of discrete frequencies.

31. The method according to claim 29, wherein the transmitter antenna has an impedance and the transmitter antenna impedance is adjusted for each of the plurality of discrete frequencies of the series of electromagnetic waves to maximize energy propagation along the drillstring.

32. The method according to claim 29, wherein the receiver antenna has an impedance and the receiver antenna impedance is adjusted to maximize energy reception of reflected electromagnetic waves for the plurality of discrete frequencies of the emitted series of electromagnetic waves.

33. The method according to claim 29, further comprising the step of forming a discrete Fourier frequency spectrum of at least two of the parameters amplitude $A(\omega)$, phase $\Phi(\omega)$, amplitude of the real part $Re(\omega)$, and amplitude of the imaginary part $Im(\omega)$ of the received electromagnetic waves, with $\omega$ corresponding essentially to each of the discrete frequencies of electromagnetic waves emitted by the transmitter antenna.

34. The method according to claim 30, further comprising the step of performing an inverse Fourier transform of at least two of the parameters amplitude $A(\omega)$, phase $\Phi(\omega)$, amplitude of the real part $Re(\omega)$, and amplitude of the imaginary part $Im(\omega)$ of the received electromagnetic waves, with $\omega$ corresponding essentially to each of the discrete frequencies of electromagnetic waves emitted by the transmitter antenna.

35. A device for detecting changes in resistivity or dielectrical properties in the near-well area around a well in a geological formation, comprising:

a tubing string, the tubing string being electrically conductive and having a linear dimension with a first end and a second end;

a means for providing electrical energy;

a means for generating electrical signals coupled to the means for providing electrical energy;

a means for emitting electromagnetic waves guided along the tubing string, the means for emitting electromagnetic waves being electronically coupled to the means for generating electrical signals;

a means for receiving reflected electromagnetic waves along the tubing string;

a means for canceling the emitted electromagnetic waves in the means for receiving reflected electromagnetic waves;

a means for receiving signals induced in the means for receiving reflected electromagnetic waves, the means for receiving signals being electronically coupled to the means for receiving reflected electromagnetic waves;

a means for processing the received signal induced in the means for receiving reflected electromagnetic waves, and for providing a processed signal output; and a means for transmitting signals representing the processed signal output and for receiving a control signal.

36. A device according to claim 35, wherein the means for generating a signal cause the means for emitting electromagnetic waves to emit coherent continuous electromagnetic waves.

37. A device according to claim 36, wherein the means for emitting electromagnetic waves emits a plurality of discrete frequencies of electromagnetic waves.

38. A device according to claim 35, further comprising a means for detecting gradients in the electromagnetic impedance in a geological formation when the tube string is placed in a well.

39. A device according to claim 37, further comprising a means for maximizing energy propagation of the emitted electromagnetic waves for each of the discrete frequencies.

40. A device according to claim 37, further comprising a means for maximizing energy reception by the means for receiving reflected electromagnetic waves.

* * * * *